United States Patent [19]
Baker

[11] 3,942,028
[45] Mar. 2, 1976

[54] MULTI-NODE ELECTRICAL NETWORK

[75] Inventor: Richard H. Baker, Bedford, Mass.

[73] Assignee: Massachusetts Institute of Technology, Cambridge, Mass.

[22] Filed: Oct. 16, 1974

[21] Appl. No.: 515,284

[52] U.S. Cl. .................................. 307/66; 323/25
[51] Int. Cl.² ........................................ H02J 7/00
[58] Field of Search ............ 323/23, 24, 25; 307/64, 307/65, 66, 252 T, 296

[56] References Cited
UNITED STATES PATENTS

| | | | |
|---|---|---|---|
| 3,002,105 | 9/1961 | Cady | 307/64 |
| 3,490,030 | 1/1970 | Kelley | 323/24 X |
| 3,509,357 | 4/1970 | Studtmann | 307/64 |

Primary Examiner—Robert K. Schaefer
Assistant Examiner—M. Ginsburg
Attorney, Agent, or Firm—Arthur A. Smith, Jr.; Robert Shaw; Martin M. Santa

[57] ABSTRACT

A multi-node network having two sets of SCRS, each set comprising a pair of parallel-connected, oppositely-polarized SCRs, the sets being electrically joined to form a common connection whereby electric current can flow through one pair to the common connection, thence to a load and/or to and through the other pair, or electric current can flow through said other pair to the load. Each SCR of the SCR pairs is triggered by transient signals such that the common connection can receive continuous power through either set of SCRs of the power and the connection can be switched between sources.

11 Claims, 3 Drawing Figures

MULTI-NODE ELECTRICAL NETWORK

The present invention relates to multi-node electrical networks and, in particular, to networks adapted to permit electric current to flow to a load from a plurality of sources of electric energy and/or from one source to another.

Filed herewith is an application for Letters Patent entitled "Electrical Apparatus" (Baker and Bannister) Ser. No. 515,290 filed Oct. 16, 1974 now U.S. Pat. No. 3,909,685 issued Sept. 30, 1975 is called to U.S. Pat. No. 3,748,492 (Baker) and U.S. Pat. No. 3,899,689 issued Aug. 12, 1975 (Baker).

In the above-mentioned Baker and Bannister application (Ser. No. 515,290) there is described, among other things, apparatus wherein a plurality of batteries is interconnected to form a power unit which accepts electric energy in a charging mode and feeds a load in a discharging mode. One type use for such apparatus is as an alternate electric power source to provide an uninterrupted power supply (UPS). In UPS, a primary source of electric energy, usually single- or three-phase service from a utility, is connected to a load which can be, by way of illustration, a computer. Loss of power to the computer for even a small part of a cycle can cause loss of memory, the computer to malfunction, etc. In the apparatus of the Baker and Bannister application, one or more of the power units can be connected together as a secondary source to supply electric energy to the load during failure of the primary source. One problem is that of switching from the primary source to the secondary source of electric energy. While the present invention has other uses than in UPS systems, it is a principal object of the invention to provide a multi-node network which acts to transfer an electrical load from, say, a primary source of electric energy to an alternate source or to a choice of alternate sources.

A further object is to provide a network of the foregoing type which acts to effect said transfer of energy in a fraction of a cycle (in perhaps 30 to 100 microseconds).

A still further object is to provide a network which, once the transfer has occurred, will retain interconnection between the alternate source and the load for some substantial part of a cycle and/or in the case of a long-term failure of the primary source, effect a permanent transfer to the secondary source.

Another object is to provide a network which can act to effect cycle skipping to the load from any of the sources of electric energy to allow the faulty source to be removed from the load for a predetermined number of power cycles as, for example, after a given number of faults (power notches) per unit time.

These and still further objects are apparent hereinafter.

The objects of the invention are achieved in a multi-node network composed of two or more SCR sets interconnected at a common connection in ways that electric energy can flow from a primary source through one set to the common connection and thence to a load and/or through another set to a secondary source to, for example, charge batteries in the second source. If for any reasons it is necessary or desired to switch load-bearing from the primary to the secondary source, that transfer is done. Each set includes a pair of parallel-connected, oppositely-polarized SCRs. (Workers in the art will recognize such pair is equivalent to a Triac and, as used herein the two are deemed identical.) The SCRs in the sets and the set interconnection result in a network in the form of a positive OR-gate in parallel with a negative OR-gate with corresponding parts of the OR-gate being connected together.

A few terms used herein are defined in this paragraph. The term "thyristor" denotes solid state devices which act like thyratron tubes and the term includes SCRs, a Triac, as abovenoted representing in effect a pair of oppositely polarized SCRs connected in parallel. As used herein, the term "active" is used to denote a thyristor that is gated ON by applying a proper gating voltage thereto; such thyristor is called "inactive" when the gate voltage is removed. When an SCR is forward biased and is switched from active to inactive, it will continue to conduct until the current is caused to go to zero by reducing the forward bias to zero or by reversing the voltage polarity. When an SCR is forward biased and is switched from inactive to active, the SCR will start to conduct immediately. When an SCR is reverse biased, it can be switched between active and inactive or from inactive to active without conducting. When an SCR is active, it will start to conduct whenever the unit becomes forward biased. When an SCR is inactive and reverse biased, it will not conduct when it is forward biased.

The invention is hereinafter described with reference to the accompanying drawing in which.

Figure 1:
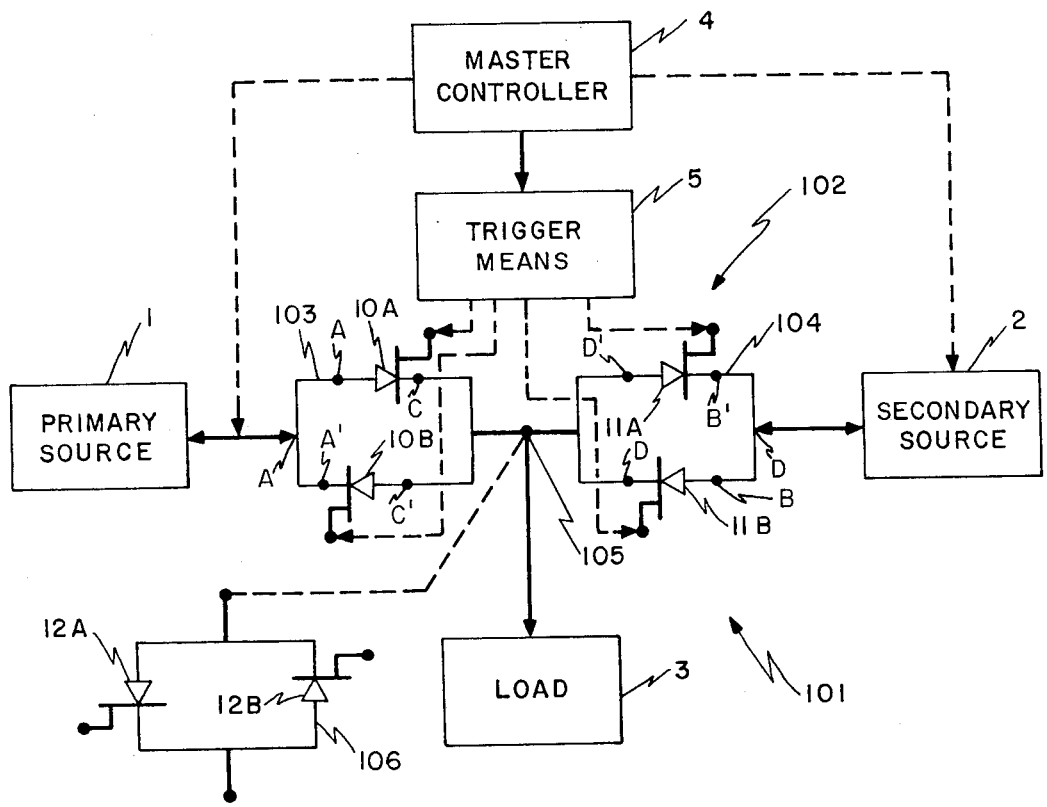
FIG. 1 is a schematic circuit diagram, partly in block diagram form, showing an electric system that includes a plurality of sets of thyristors interconnected in accordance with the present invention concepts.

Turning now to FIG. 1, an electric system is shown at 101 comprising a primary source of electric energy 1, a secondary source of electric energy 2 and a load 3. The transfer of electric energy between the sources thereof and between the sources and the load is channeled by a multi-node network or power-T labeled 102 in the FIGURE, as later explained. For ease of explanation, the system 101 is considered to be single-phase, a-c, and 60 Hz. The primary source is the power company service and the secondary source is a power unit as discussed in said application Ser. No. 515,290 (Baker and Bannister). It is sufficient for purposes of this application to note that the particular power unit for present purposes is composed of a number of storage batteries interconnected to receive electric energy from the primary source 1 and, in the event, say, of a failure of the source 1 to deliver 60 Hz, single-phase, a-c power to the load 3. Energy flow is controlled by the power-T under the direction of a master controller 4 through trigger means 5, which acts to activate and de-activate the thyristors in the power-T, as now discussed.

The multi-node network 102 comprises at least two sets 103 and 104 of SCRs, each set comprising a pair of parallel-connected and oppositely-polarized SCRs, the set 103 being made up of SCRs 10A and 10B and the set 104 being made up of SCRs 11A and 11B. In each thyristor pair 10A-10B and 11A-11B, the SCRs are parallel-connected and oppositely polarized. Thus, with an appropriate gate signal from the trigger means 5 to activate the SCRs 10A and 10B, the SCR 10A will conduct to the right in FIG. 1 and the SCR 10B will conduct to the left. THe sets 103 and 104 are connected together in a Y-connection to provide a common connection 105 between the pairs to permit electric current to pass from the primary source, through the SCR pair 10A–10B to the common connection 105 and to the load, through the SCR pair 10A–10B to the common connection 105 and thence through the other SCR pair 11A–11B to the source 2, and from the source 2 through the SCR pair 11A–11B to the common connection 105 and to the load 3, as alternate, successive or simultaneous conditions of network 102 operation — all under the direction of the master controller 4.

Figure 2:
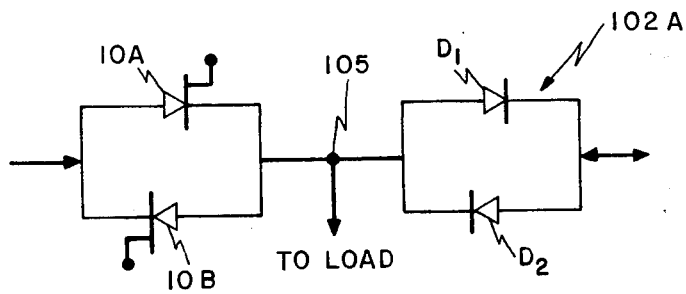
FIG. 2 is a schematic of a modification of part of the system of FIG. 1.
Figure 3:
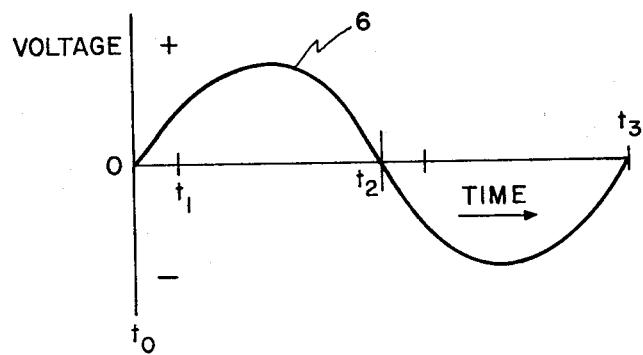
FIG. 3 shows a time voltage waveform.

In FIG. 3, the voltage waveform numbered 6 is taken to be the time-varying voltage output of the primary source 1. If prior to $t_o$ (preferably just a little prior to time $t_o$) the SCR 10A is activated, it will, as the waveform 6 goes positive, be forward biased and will conduct current to the common connection 105 and to the load. If the SCR 11A is activated, it will similarly conduct, or at least be able to conduct, from the common connection 105 to the source 2. The SCR 10A is de-activated just after $t_o$. It is now assumed that at time $t_1$ there is a power glitch and the voltage from the primary source fails momentarily; then the SCR 10A will stop conducting and will continue non-conducting, since it has been de-activated immediately following time $t_o$, as above noted. The secondary source 2 which contains batteries and which, under supervision of the master controller 4 (see the Baker and Bannister application, Ser. No. (515,290), is in phase with the primary source 1, at this juncture feeds current through the set 104 to the load. In fact, what happens here is that as soon as the instantaneous voltage of the waveform 6 goes below the output voltage of the secondary source 2, there is a transfer of load-bearing duties from the primary source 1 to the secondary source 2. Toward this end the SCRs 11A and 11B are usually d-c activated and, indeed, are replaced by diodes $D_1$ and $D_2$ in the power-T labeled 102A in FIG. 2, for some uses.

It will now be appreciated on the basis of the above explanation, that the timing of activation, particularly of SCRs 10A and 10B, is important. Usually the SCR 10A is activated slightly before time $t_o$ and deactivated shortly thereafter; the SCR 10B is activated just slightly before the time $t_2$ and deactivated shortly thereafter. In the event of a power glitch in the primary source after time $t_1$, power can be shifted back at $t_2$, or can be held off until time $t_3$ or some later time. Also, it should be noted that activation of SCRs 10A–10B and 11A–11B can be used to effect cycle skipping as to the load 3 for modulating input power to the load.

A further matter will now be appreciated on the basis of the foregoing explanation; the SCRs 10A and 11B together constitute a positive OR-gate and the SCRs 10B and 11A together constitute a negative OR-gate; and the two OR-gates thus formed are connected in parallel with corresponding ports A and A', B and B', C–D and C'–D' connected directly together as shown.

A further set of SCRs 106 (or further such sets) can be used to connect additional secondary sources of a-c electric energy, like the source 2, to the common connection 105. The set 106 comprises SCRs 12A and 12B.

The trigger means 5 can contain flip-flop circuits and other well-known pulse circuitry. The master controller can be microprocessor that includes photo coupling (as is known to workers in this art) a clock, flip-flops, gates, and other assorted circuitry interconnected to perform standard data processing functions, such as, for example, signal mixing, time-sequence generation, code selections, etc.; see for example, basic logic circuits in the text, "Analog-to-Digital/Digital-to-Analog Conversion Techniques" (David F. Hoeschele, Jr., John Wiley & Sons, Inc., 1968); "Digital Computer Fundamentals" (Thomas C. Bartee, McGraw-Hill Book Co., Inc., 1960); and many articles in trade journals, e.g., electronics, Nov. 8, 1973 and other issues. The master controller functions can be obtained by using standard microprocessor units readily available in chip form from many manufacturers.

Modifications of the invention herein disclosed will occur to persons skilled in the art and all such modifications are deemed to be within the spirit and scope of the present invention as defined by the appended claims.

What is claimed is:

1. An electric system that comprises, in combination, a first source of a-c electric energy, a second source of a-c electric energy, means maintaining the first source and the second source in time phase, a load and a multinode network interconnection the first source, the second source and the load, said multi-node network comprising at least two sets of SCRs, each set comprising a pair of parallel-connected and oppositely polarized SCRs, said two sets being connected together to provide a common connection between the pairs to permit current to pass from the first source through one pair to the common connection and thence to the load, through said one pair to the common connection and thence through the other pair to the second source, and from said second source through said other pair to the common connection and thence to the load, as alternate, successive or simultaneous conditions of network operation.

2. A multi-node network as claimed in claim 1 that further include trigger-means connected to activate each SCR by a transient gate signal either concurrently with or slightly ahead of the onset of a time-varying forward bias voltage across the SCR.

3. A multi-node network as claimed in claim 1 that further includes trigger-means connected to activate each SCR of each set in a programmed fashion.

4. Apparatus as claimed in claim 3 in which said second source includes electric storage batteries and in which the trigger means in combination with the two sets, acts to permit electric energy to flow from the first source to the load as well as to the second source and, in the event of interruption of electric energy flow from the first source, to permit electric energy to flow from the second source of electric energy to the load.

5. Apparatus as claimed in claim 4 in which the trigger means acts in combination with connected sets to cause the second source of electric energy to power the load through the remaining part of the current cycle of the first source and to trigger the one set just prior to the beginning of the next cycle of current of the first source to permit said first source to feed electric energy to the load at the onset of said next cycle.

6. A multi-node network as claimed in claim 1 that further includes trigger-signal means connected to activate each SCR of each set in a predetermined manner such that each SCR of each set is activated by a transient gate signal concurrently with the onset of a time-varying forward bias voltage across the SCR or just slightly before set onset, thereby to cause an SCR, once it has ceased conducting, to conduct again only at the beginning of a new voltage cycle.

7. In an electrical system to energize a load, apparatus that comprises, in combination, a primary source of a-c electric energy, a secondary source of a-c electric energy, means maintaining the two sources substantially in time phase, and semiconductor means connected between the primary source and the secondary source and the load, said semiconductor means being connected in a series-parallel network combination such that the network forms a positive OR-gate in parallel with a negative OR-gate, corresponding parts of the two OR-gates being connected directly together, the semiconductor means being thyristors.

8. Electrical apparatus that comprises a load, a primary source of a-c power, a secondary source of a-c power, means maintaining the two sources substantially in time phase and semiconductor means interconnecting the two sources, said semiconductor means being connected in a series-parallel network combination such that the network forms a positive OR-gate in parallel with a negative OR-gate, corresponding parts of the two OR-gates being connected directly together and being network parts through which electric current can flow in either direction of flow and in a controllable fashion from the primary source to the secondary source and between the two sources and the load.

9. An electric system having in combination, a load, a primary source of electric energy to energize the load, a secondary source of electric energy to energize the load, means maintaining the secondary source in time phase with the primary source, and a multi-node network connected between the sources and the load, that comprises a set of thyristors oppositely polarized and a set of rectifier means oppositely polarized, the two sets being connected together to provide a common connection therebetween to permit electric current to pass from the primary source of electric energy through one set to the common connection and thence to the load and from the secondary source of electric energy through said other set to the common connection and thence to the load, as alternate, successive or simultaneous conditions of network operations.

10. Apparatus as claimed in claim 9 in which the set of rectifier means comprises oppositely-polarized diodes.

11. Apparatus as claimed in claim 10 wherein the secondary source comprises a plurality of batteries interconnected to form a power unit which accepts electric energy in a charging mode and feeds the load in a discharging mode and wherein said means maintaining the secondary source in time phase comprises master control means that supervises interconnection of said batteries.

* * * * *